Patented Aug. 5, 1941

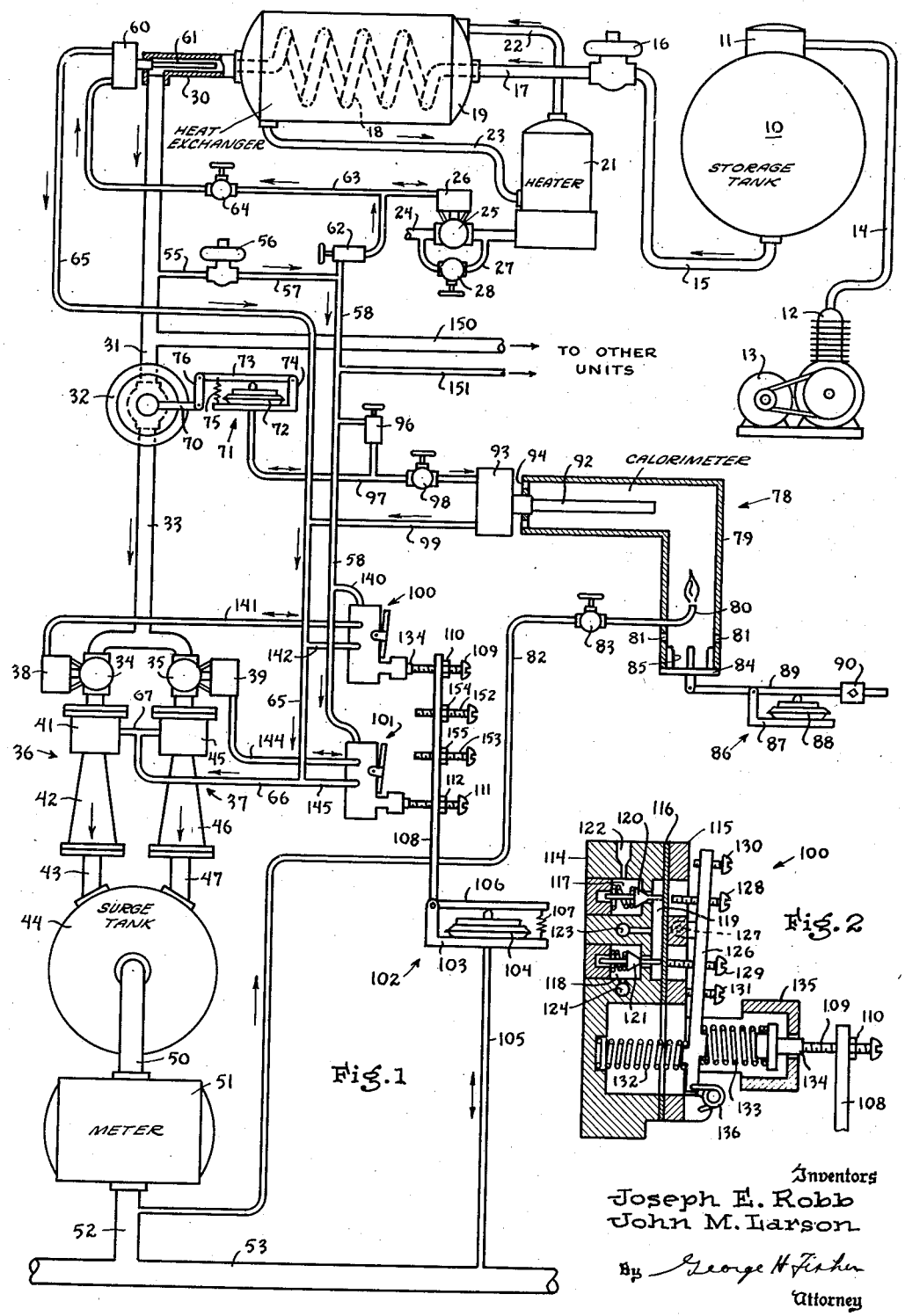

2,251,636

UNITED STATES PATENT OFFICE 2,251,636

CONTROL SYSTEM FOR GAS-AIR PLANTS

Joseph E. Robb, Overland Park, Kans., and John M. Larson, Chicago, Ill., assignors to Minneapolis-Honeywell Regulator Company, Minneapolis, Minn., a corporation of Delaware Application April 7, 1939, Serial No. 266,674

19 Claims. (Cl. 48—180)

This invention relates to automatic control systems for gas-air plants. Prior to this invention it has been usual to utilize electrical control systems for controlling the operation of gas-air plants but this has not been entirely satisfactory for several reasons. Electrical control systems require external energy in the form of electricity which necessarily adds to the expense of operation of the plant. A failure in the supply of electrical energy is not an uncommon occurrence and under these conditions the control system is rendered inoperative which is not conducive of safe and economical operation of the gas-air plant. Further electrical control systems are subject to sparking which may cause serious explosions.

The prime object of this invention is to provide an automatic control system for gas-air plants which eliminates the above difficulties whereby safe and economical operation of gas-air plants is at all times assured. In carrying out this invention the inherent energy in the gas-air plant itself, that is the inherent pressure differentials therein, are utilized for the motivating power of the automatic control system. Thus, the control system of this invention is not dependent upon external energy and is therefore not subject to the above outlined difficulties.

Other objects of this invention reside in the construction of the automatic control system its application to gas-air plants and the sequence of operation obtained thereby.

For a more thorough understanding of this invention reference is made to the accompanying drawing in which Figure 1 is a diagrammatic illustration of a gas-air plant with the automatic control system of this invention applied thereto, and Figure 2 is a sectional view of one of the control valves utilized in the automatic control system.

Although this invention is applicable to any type of gas-air producing plant it is disclosed for purposes of illustration to be a gas-air plant utilizing a volatile liquid fuel such as butane. Liquid butane is placed in a storage tank 10 through a pressure tight filler 11 and due to the volatility of the butane the pressure of the butane in the tank 10 usually remains above 70 lbs. at normal atmospheric conditions. Accordingly the butane is stored in the tank 10 under a relatively high pressure. If during cold weather the pressure in the tank 10 tends to decrease a compressor 12 operated by a motor 13 may be utilized for delivering compressed air through a pipe 14 to the tank 10 to insure that the pressure in the tank 10 will always remain at a relatively high pressure.

Liquid butane flows from the storage tank 10 through a liquid line 15, a pressure reducing valve 16, and a line 17 to a coil 18 located in a tank 19. For purposes of illustration it is assumed that the pressure reducing valve 16 reduces the pressure of the liquid butane to substantially 50 lbs. The coil 18 and the tank 19 form a heat exchanger or vaporizer for the liquid butane for the purpose of changing the liquid to a gas. A boiler 21 supplies hot water through a pipe 22 to the tank 19 for heating the butane in the coil 18 and water is returned from the tank 19 through a pipe 23 to the boiler 21. The boiler 21 may be fired by a gas burner (not shown) receiving gas from a supply pipe 24. The supply of gas to the burner is controlled by a valve 25 which in turn is operated by a pressure motor 26. The pressure motor 26 modulatingly positions the gas valve 25 to regulate in a modulating manner the flame of the gas burner. A by-pass 27 around the valve 25 is controlled by a manually operated valve 28 and may be utilized for preventing extinguishment of the gas flame.

Butane in the form of a gas flows from the coil 18 of the vaporizer through a fitting 30, a conduit 31, an adjustable pressure regulating valve 32, a conduit 33, and parallelly arranged valves 34 and 35 into inspirators 36 and 37. The adjustable pressure regulating valve 32 reduces the pressure of the gas supplied to the inspirators 36 and 37 to illustratively 35 lbs. and this pressure regulating valve may be automatically adjusted in a manner to be more fully set forth hereafter. The valves 34 and 35 are moved to either opened or closed positions by pressure motors 38 and 39, respectively. When the valves 34 and 35 are opened their respective inspirators 36 and 37 are placed in operation and when these valves are closed their respective inspirators are rendered inoperative.

The inspirator 36 may comprise a suction manifold connected to a Venturi tube, the gas passing through the Venturi tube entraining air through a suction manifold 41. The mixture of gas and air is discharged from the inspirator 36 through a conduit 43 into a surge tank 44. The inspirator 37 may comprise a suction manifold 45 and a Venturi tube 46 for mixing gas and air and discharging the mixture of gas and air through a pipe 47 into the surge tank 44. The conduits 43 and 47 may be provided with check valves to prevent back flow therethrough. For purposes of illustration it is assumed that when the pressure regulating valve 32 is set for 35 lbs. the inspirators 36 and 37 will entrain sufficient air to cause the heat content of the mixture of gas and air to be substantially 880 B. t. u.

The mixture of gas and air flows from the surge tank 44 through a conduit 50, a send out meter 51 and conduit 52 into a supply main 53. The supply main distributes the mixture of gas and air at substantially 1½ to 1¾ lbs. pressure to various gas utilizing appliances connected thereto.

A pipe 55 connected to the conduit 31 between the vaporizer and the pressure regulating valve 32 supplies gas under pressure through a pressure reducing valve 56 and pipe 57 to a header 58. The gas supplied to the header 58 is reduced by the pressure reducing valve 56 to substantially 15 lbs. and the gas in the header 58 is utilized as the motivating power of the automatic control system presently to be described. As an alternate arrangement, the pipe 55 could be connected into the storage tank 10 above the level of the liquid therein for supplying power to the automatic control system.

The pressure motor 26 and hence the valve 25 which regulates the supply of gas to the boiler 21 is controlled by a thermostatically operated control valve 60 having a thermostatic element 61 extending into the fitting 30 so as to respond to the temperature of the gas leaving the heat exchanger or vaporizer. Gas at 15 lbs. is supplied from the header 58 through an adjustable restriction 62 to a branch line 63 connected between the pressure motor 26 and the control valve 60. Upon an increase in pressure in the branch line 63 the valve 25 is moved toward an open position and conversely upon a decrease in pressure the valve 25 is moved towards a closed position. Valve 60 is so arranged that upon an increase in temperature of the gas leaving the vaporizer it increases the bleeding action and therefore reduces the pressure in the branch line 63 and conversely upon an increase in temperature the bleeding action is decreased to increase the pressure in the branch line 63. For purposes of illustration it is assumed that the thermostatic control valve 60 is adjusted to operate through its complete range of movement between 160° and 180°. Accordingly it is seen that as the temperature of the gas leaving the vaporizer decreases the valve 25 is moved towards an open position and as the temperature increases the valve 25 is moved towards a closed position. The temperature of the gas leaving the vaporizer is therefore maintained between 160° and 180°. The usual shut-off cock 64 may be provided in the branch line 63. The gas bled from the branch line 63 by the thermostatic valve 60 is conducted by pipes 65, 66 and 67 to the suction manifolds 41 and 45 of the inspirators 36 and 37 so that the gas utilized in the automatic control system is disposed of in the inspirators 36 and 37.

The adjustable pressure regulating valve 32 may be of the conventional type having an adjustable spring for varying the pressure setting thereof. An arm 70 is utilized for adjusting this spring and hence the pressure setting of the pressure regulating valve 32. For purposes of illustration it is assumed that when the arm 70 is moved upwardly the pressure setting of the pressure regulating valve 32 is raised and when the arm 70 is moved downwardly the pressure setting is lowered. The arm 70 is automatically positioned by a pressure motor generally designated at 71 and this pressure motor may comprise a bellows 72 carried by a suitable support 74 for operating a lever 73 pivoted to the support 74 against the action of an adjustable tension spring 75. The lever 73 is connected to the arm 70 by a link 76. It is therefore seen that as the pressure in the bellows 72 increases the pressure setting of the pressure regulating valve is raised and as the pressure in the bellows decreases the pressure setting is lowered.

The pressure motor 71 and hence the pressure regulating valve 32 are controlled by a calorimeter generally designated at 78. The calorimeter 78 may comprise an L-shaped enclosure 79 and located in one portion of the enclosure 79 is a burner 80. A predetermined amount of a mixture of gas and air is supplied to the burner 80 from the conduit 52 through a pipe 82 under the control of a valve 83 for measuring purposes. Combustion supporting air is supplied to the burner 80 through openings 81 in the enclosure 79. In order to compensate for changes in ambient temperature the supply of combustion supporting air for the burner 80 is controlled by a damper 84 suitably guided by guides 85 in the enclosure 79. The damper 84 is operated by an ambient temperature responsive thermostat generally designated at 86. This thermostat may comprise a support 87 carrying a bellows 88 containing a volatile fluid. The bellows 88 operates a lever 89 pivoted to the support 87 against the action of a weight 90, the lever 89 in turn operating the damper 84. The damper 84 is closed at an ambient temperature of substantially 50° but as the ambient temperature increases above that value the damper 84 is moved towards an open position to supply more air to the enclosure which has a cooling effect to compensate for the increased heating effect caused by the increase in ambient temperature. In other words, the ambient temperature responsive thermostat 86 varies the supply of air in accordance with ambient temperature changes so that the heat given off by the flame of the burner 80 does not vary in accordance with changes in ambient temperature. By reason of this arrangement changes in ambient temperature do not affect the heat given off by the burner 80, and for purposes of illustration it is assumed that the burner maintains the temperature within the enclosure 79 at substantially 150°. Located in another portion of the L-shaped enclosure 79 is a thermostatic element 92 and it is here noted that the purpose of the L-shaped enclosure is to prevent radiant heat from the burner 80 from affecting the thermostatic element 92. The thermostatic element 92 is suitably carried by the enclosure 79 and operates a control valve 93. Suitable vents 94 are provided to liberate the gases of combustion from the enclosure 79.

The control valve 93 operates to bleed gas from a branch line and upon an increase in temperature the bleeding action is increased to decrease the pressure in the branch line. Likewise upon a decrease in temperature the bleeding action is decreased to increase the pressure in the branch line. Gas from the header 58 is supplied through an adjustable restriction 96 to a branch line 97 connected between the thermostatic control valve 93 and the pressure motor 71 and if desired this branch line may be provided with a shut-off cock 98. For purposes of illustration it is assumed that the pressure regulating valve 32 and the calorimeter 78 are so arranged that a balanced condition will arise when the heat content of the mixture of gas and air leaving the send out meter 51 is substantially 880 B. t. u. If now the heat content of the mixture of gas and air should decrease the temperature of the flame in the calorimeter will decrease and the thermostatic control valve 93 will sense this decrease in temperature to increase the pressure in the branch line 97. This increase in pressure in the branch line 97 adjusts upwardly the setting of the pressure regulating valve 32 to admit more gas to the inspirators 36 and 37 to raise the heat content of the mixture of gas and air. Conversely upon an increase in heat content of the mixture of gas and air the temperature of the flame in the calorimeter 78 increases and the thermostatic control valve 93 sensing this increase in temperature will decrease the pressure in the branch line 97. This decrease in pressure lowers the setting of the pressure regulating valve 32 to decrease the supply of gas to the inspirators 36 and 37. In the above manner the calorimeter 78 operates to adjust the setting of the pressure regulating valve 32 to maintain the heat content of the mixture of gas and air at a substantially constant value at all times. Gas is conducted from the control valve 93 through pipes 99, 65, 66 and 67 to the suction manifolds of the inspirators 36 and 37.

The pressure motor 38 and hence the valve 34 are controlled by a snap action control valve generally designated at 100 and the pressure motor 39 and hence the valve 35 are controlled by a snap action control valve 101. The snap action control valves 100 and 101 are in turn controlled by a pressure motor generally designated at 102. The pressure motor 102 may comprise a support 103 for carrying a bellows 104 which is connected by a pipe 105 to the supply main 53. The bellows 104 operates a bell crank lever 106 pivoted to the support 103 against the action of an adjustable tension spring 107, the bell crank lever comprising an arm operated by the bellows 104 and an operating arm 108. The operating arm 108 carries an adjustable screw 109 locked in place by a locknut 110 for operating the snap action control valve 100 and it also carries an adjustable screw 111 locked in place by a locknut 112 for operating the snap action control valve 101. Upon an increase in pressure in the supply main 53 the control arm 108 is moved to the left and upon a decrease in pressure the control arm 108 is moved to the right. For purposes of illustration it is assumed that complete left-hand and right-hand movement of the control arm 108 occurs as the pressure in the supply main 53 varies from 1½ to 1¾ lbs.

The construction of the snap action control valve 100 is shown in detail in Figure 2. This control valve may comprise component parts 114 and 115 separated by a diaphragm 116. The part 114 is provided with an inlet chamber 117 and an outlet chamber 118 and a branch chamber 119 is defined by the part 114 and the diaphragm 116. A normally closed valve 120 controls communication between the inlet chamber 117 and the branch chamber 119 and a normally closed valve 121 controls communication between the outlet chamber 118 and the branch chamber 119. Gas is supplied to the inlet chamber 117 from the gas header 58 through a port 122, the branch chamber 119 is connected by a port 123 to the branch line to be controlled and the outlet chamber 118 is connected by a port 124 to pipes leading to the suction manifold of the inspirators 36 and 37.

A lever 126 is pivoted at 127 to the part 115 and carries an adjustable screw 128 for opening the inlet valve 120 and an adjustable screw 129 for opening the outlet valve 121. Adjustable screws 130 and 131 limit the amount of rotation of the lever 126 about its pivot 127. A spring 132 urges the lever 126 in a counter-clockwise direction to open the valve 120 and close the valve 121. A second spring 133 is adapted to overcome the first spring 132 to move the lever 126 in a clockwise direction to open the outlet valve 121 and close the inlet valve 120. The spring 133 engages an abutment 134 guided in a sub-housing 135 and the abutment 134 is adapted to be engaged by the adjustable screw 109 of the pressure motor 102. Thus it is seen that when the pressure in the supply main increases the lever 126 is moved to the position shown in Figure 2 to close the inlet valve 120 and to open the outlet valve 121 whereby the branch line is connected directly to the suction manifolds of the inspirators 36 and 37. Upon a decrease in pressure the outlet valve 121 is closed and the inlet valve 120 is opened to connect the gas supply from the header 58 to the branch line. A spiral spring 136 connected between the lever 126 and the part 115 is utilized for operating the lever 126 with an over-center snap action whereby the valves 120 and 121 are operated quickly.

Referring now to Figure 1 gas is supplied to the snap action control valve 100 by a pipe 140 leading from the gas header 58 and the valve 100 is connected by a branch line 141 to the pressure motor 38. The valve is also connected by pipes 142, 65, 66, and 67 to the suction manifolds of the inspirators 36 and 37. Thus it is seen that when the pressure in the supply main 53 increases the valve 100 is operated to vent gas through the branch line 141 from the pressure motor 38 and the valve 34 is thereupon closed to render the inspirator 36 inoperative. As the pressure in the supply main 53 decreases the valve 100 connects the branch line 141 to the supply header 58 to supply pressure to the pressure motor 38 to open the valve 34.

The structure of the snap action control valve 101 is exactly the same as that of the snap action control valve 100. Gas is supplied from the header 58 to the control valve 101, the control valve 101 is connected to the pressure motor 39 by a branch line 144 and the control valve is connected by pipes 145, 66 and 67 to the suction manifolds of the inspirators 36 and 37. Accordingly it is seen that upon an increase in pressure in the supply main 53 the valve 35 is closed and upon a decrease in pressure the valve 35 is opened. By properly adjusting the adjustable screws 109 and 111 the valves 34 and 35 may be operated in a sequential manner so that the inspirators 36 and 37 may be rendered operative and inoperative, respectively, at different pressures in the supply main. In this way a more graduate control is obtained so that the pressure in the supply main 53 may be maintained within relatively narrow limits.

Gas may be supplied from the conduit 31 through a pipe 150 to other units which may be identical in construction and operation as the unit illustrated in Figure 1 and gas may be supplied from the header 58 through a pipe 151 to the control system of the other units which in turn may be the same as that disclosed in Figure 1. If additional units are utilized the control arm 108 of the pressure motor 102 may be provided with additional adjustable screws 152 and 153 locked in place by locknuts 154 and 155, respectively, for operating additional snap action control valves similar to the control valves 100 and 101. Thus any number of units may be controlled by the single pressure motor 102 to maintain desired pressure conditions in the supply main 53. By controlling all of the inspirators of the various units by the single pressure motor 102 a more accurate sequencing of operation may be obtained than could be obtained by utilizing a plurality of pressure motors each controlling a snap action control valve. In this latter arrangement it would be quite difficult to accurately adjust the pressure setting of each of these pressure motors.

If it be desirable to operate both inspirators 36 and 37 simultaneously instead of independently as shown in Figure 1 a single valve may be utilized for controlling the supply of gas through both inspirators and this valve could either be located in conduit 33 downstream of the pressure regulator 32 or in the conduit 31 upstream of the pressure regulator 32.

Although for purposes of illustration one form of this invention has been disclosed, other forms of this invention may become apparent to those skilled in the art upon reference to this disclosure and therefore this invention is to be limited only by the scope of the appended claims and the prior art.

We claim as our invention:

1. In a gas-air producing plant, the combination of, a source of gas under pressure, inspirator means receiving gas under pressure from said source for entraining air, a supply main for receiving a mixture of gas and air at a reduced pressure from the inspirator means, first valve means for controlling the supply of gas from the source to the inspirator means for rendering the inspirator means operative and inoperative, pressure motor means for operating the first valve means, second valve means for admitting gas under pressure from said source to the pressure motor means and for exhausting gas therefrom, and means responsive to the pressure of the mixture of gas and air in the supply main for operating the second valve means to maintain the pressure in the supply main substantially constant.

2. In a gas-air producing plant, the combination of, a source of gas under pressure, inspirator means receiving gas under pressure from said source for entraining air, a supply main for receiving a mixture of gas and air at a reduced pressure from the inspirator means, a first adjustable pressure regulating valve for controlling the supply of gas from the source to the inspirator means to maintain the pressure of the gas entering the inspirator means at desired values, a pressure motor for adjusting the setting of the first pressure regulating valve, means for supplying gas under pressure from said source to the pressure motor, a second control valve for graduatingly regulating the supply of gas to the pressure motor, and means, including a calorimeter for measuring the heat content of the mixture of gas and air delivered to the supply main, for operating the second control valve to maintain the heat content of the mixture of the gas and air substantially constant.

3. In a gas-air producing plant, the combination of, a source of gas under pressure, inspirator means receiving gas under pressure from said source for entraining air, a supply main for receiving a mixture of gas and air at a reduced pressure from the inspirator means, first valve means for controlling the supply of gas from the source to the inspirator means for rendering the inspirator means operative and inoperative, pressure motor means for operating the first valve means, second valve means for admitting gas under pressure from said source to the pressure motor means and for exhausting gas therefrom, means responsive to the pressure of the mixture of gas and air in the supply main for operating the second valve means to maintain the pressure in the supply main substantially constant, an adjustable pressure regulating valve for controlling the supply of gas from the source to the inspirator means to maintain the pressure of the gas entering the inspirator means at desired values, a pressure motor for adjusting the setting of the pressure regulating valve, means for supplying gas under pressure from said source to the pressure motor, third valve means for graduatingly regulating the supply of gas to the pressure motor, and means, including a calorimeter for measuring the heat content of the mixture of gas and air delivered to the supply main, for operating the third valve means to maintain the heat content of the mixture of the gas and air substantially constant.

4. In a gas-air producing plant, the combination of, a source of gas under pressure, inspirator means receiving gas under pressure from said source for entraining air, a supply main for receiving a mixture of gas and air at a reduced pressure from the inspirator means, a first adjustable pressure regulating valve for controlling the supply of gas from the source to the inspirator means to maintain the pressure of the gas entering the inspirator means at desired values, a pressure motor for adjusting the setting of the first pressure regulating valve, means for supplying gas under pressure from said source to the pressure motor, a second control valve for graduatingly regulating the supply of gas to the pressure motor, and means for operating the second control valve to maintain the heat content of the mixture of gas and air substantially constant, said last mentioned means including an enclosure, a burner in one portion of the enclosure, means for supplying a mixture of gas and air produced by the inspirator means to the burner, a temperature responsive device located in the other portion of the enclosure so as to be unaffected by radiant heat from the burner, thermostatically controlled means responsive to ambient temperature conditions for regulating the supply of combustion supporting air to the burner, and means operated by the temperature responsive means for operating the second control valve.

5. In a gas-air producing plant, the combination of, a source of gas under pressure, inspirator means receiving gas under pressure from said source and including a Venturi tube and a suction manifold for entraining air, a supply main for receiving a mixture of gas and air at a reduced pressure from the inspirator means, first valve means for controlling the supply of gas from the source to the inspirator means for rendering the inspirator means operative and inoperative, pressure motor means for operating the first valve means, second valve means for admitting gas under pressure from said source to the pressure motor means and for exhausting gas therefrom to the suction manifold of the inspirator means, and means responsive to the pressure of the mixture of the gas and air in the supply main for operating the second valve means to maintain the pressure in the supply main substantially constant.

6. In a gas-air producing plant, the combination of, a source of gas under pressure, inspirator means receiving gas under pressure from said source and including a Venturi tube and a suction manifold for entraining air, a supply main for receiving a mixture of gas and air at a reduced pressure from the inspirator means, first adjustable pressure regulating valve for controlling the supply of gas from the source to the inspirator means to maintain the pressure of the gas entering the inspirator means at desired values, a pressure motor for adjusting the setting of the first pressure regulating valve, means including a restriction for supplying gas under pressure from said source to the pressure motor, a second control valve for venting the gas from the pressure motor to the suction manifold of the inspirator means, and means, including a calorimeter for measuring the heat content of the mixture of gas and air delivered to the supply main, for operating the second control valve to maintain the heat content of the mixture of the gas and air substantially constant.

7. In a gas-air producing plant, the combination of, a source of gas under pressure, inspirator means receiving gas under pressure from said source and including a Venturi tube and a suction manifold for entraining air, a supply main for receiving a mixture of gas and air at a reduced pressure from the inspirator means, first valve means for controlling the supply of gas from the source to the inspirator means for rendering the inspirator means operative and inoperative, pressure motor means for operating the first valve means, second control valve means for admitting gas under pressure from said source to the pressure motor means and for exhausting gas therefrom to the suction manifold of the inspirator means, means responsive to the pressure of the mixture of the gas and air in the supply main for operating the second control valve means to maintain the pressure in the supply main substantially constant, a third adjustable pressure regulating valve for controlling the supply of gas from the source to the inspirator means to maintain the pressure of the gas entering the inspirator means at desired values, a pressure motor for adjusting the setting of the third pressure regulating valve, means including a restriction for supplying gas under pressure from said source to the pressure motor, a fourth control valve for venting the gas from the pressure motor to the suction manifold of the inspirator means, and means, including a calorimeter for measuring the heat content of the mixture of gas and air delivered to the supply main, for operating the fourth control valve to maintain the heat content of the mixture of the gas and air substantially constant.

8. In a gas producing plant, the combination of, a source of volatile liquid fuel under pressure, a heat exchanger for vaporizing the volatile liquid fuel into a gas under pressure, means for supplying volatile liquid fuel to the heat exchanger, means for withdrawing gas under pressure from the heat exchanger, a first pressure regulating valve for reducing the pressure of the gas to a relatively low value, a conduit for receiving the gas at reduced pressure from the first pressure regulating valve, heating means for supplying a heating fluid to the heat exchanger for vaporizing the volatile liquid fuel, second valve means for controlling the heating effect of the heating means, pressure motor means for operating the second valve means, means including a restriction for supplying gas under pressure from the upstream side of the first pressure regulating valve to the pressure motor means, a third control valve for venting gas from the pressure motor means to the conduit on the downstream side of the pressure regulating valve, and means controlled by the temperature of the gas leaving the heat exchanger for operating the third control valve to maintain the temperature of the gas substantially constant.

9. In a gas-air producing plant, the combination of, a source of volatile liquid fuel under pressure, a heat exchanger for vaporizing the volatile liquid fuel into a gas under pressure, means for supplying volatile liquid fuel from said source to the heat exchanger, a conduit for withdrawing gas under pressure from the heat exchanger, inspirator means for receiving gas from said conduit for entraining air, a supply main for receiving a mixture of gas and air at a reduced pressure from the inspirator means, a first pressure regulating valve for regulating the supply of gas from said conduit to the inspirator means to maintain the pressure of the gas entering the inspirator means at desired values, heating means for supplying a heating fluid to the heat exchanger for vaporizing the volatile liquid fuel, second valve means for controlling the heating effect of the heating means, a pressure motor for operating said second valve means, means for supplying gas under pressure from said conduit to the pressure motor, a third control valve for regulating the supply of gas to the pressure motor, means controlled by the temperature of the gas leaving the heat exchanger for operating the third control valve to maintain the temperature of the gas substantially constant, fourth valve means for controlling the supply of gas from the conduit to the inspirator means for rendering the inspirator means operative and inoperative, pressure motor means for operating the fourth valve means, fifth control valve means for admitting gas under pressure from said conduit to the pressure motor means and for exhausting air therefrom, and means responsive to the pressure of the mixture of gas and air in the supply main for operating the fifth control valve means to maintain the pressure in the supply main substantially constant.

10. In a gas-air producing plant, the combination of, a source of volatile liquid fuel under pressure, a heat exchanger for vaporizing the volatile liquid fuel into a gas under pressure, means for supplying volatile liquid fuel from said source to the heat exchanger, a conduit for withdrawing gas under pressure from the heat exchanger, inspirator means for receiving gas from said conduit for entraining air, a supply main for receiving a mixture of gas and air at a reduced pressure from the inspirator means, a first pressure regulating valve for regulating the supply of gas from said conduit to the inspirator means to maintain the pressure of the gas entering the inspirator means at desired values, heating means for supplying a heating fluid to the heat exchanger for vaporizing the volatile liquid fuel, second valve means for controlling the heating effect of the heating means, a pressure motor for operating said second valve means, means for supplying gas under pressure from said conduit to the pressure motor, a third control valve for regulating the supply of gas to the pressure motor, means controlled by the temperature of the gas leaving the heat exchanger for operating the third control valve to maintain the temperature of the gas substantially constant, a pressure motor for adjusting the setting of the first pressure regulating valve, means for supplying gas under pressure from said conduit to the pressure motor, a fourth control valve for regulating the supply of gas to the pressure motor, and means, including a calorimeter for measuring the heat content of the mixture of gas and air delivered to the supply main, for operating the fourth control valve to maintain the heat content of the mixture of the gas and air substantially constant.

11. In a gas-air producing plant, the combination of, a source of volatile liquid fuel under pressure, a heat exchanger for vaporizing the volatile liquid fuel into a gas under pressure, means for supplying volatile liquid fuel from said source to the heat exchanger, a conduit for withdrawing gas under pressure from the heat exchanger, inspirator means for receiving gas from said conduit for entraining air, a supply main for receiving a mixture of gas and air at a reduced pressure from the inspirator means, a first pressure regulating valve for regulating the supply of gas from said conduit to the inspirator means to maintain the pressure of the gas entering the inspirator means at desired values, heating means for supplying a heating fluid to the heat exchanger for vaporizing the volatile liquid fuel, second valve means for controlling the heating effect of the heating means, a pressure motor for operating said valve means, second means for supplying gas under pressure from said conduit to the pressure motor, a third control valve for regulating the supply of gas to the pressure motor, means controlled by the temperature of the gas leaving the heat exchanger for operating the third control valve to maintain the temperature of the gas substantially constant, fourth valve means for controlling the supply of gas from the conduit to the inspirator means for rendering the inspirator means operative and inoperative, pressure motor means for operating the fourth valve means, fifth control valve means for admitting gas under pressure from said conduit to the pressure motor means and for exhausting gas therefrom, means responsive to the pressure of the mixture of gas and air in the supply main for operating the fifth control valve means to maintain the pressure in the supply main substantially constant, a pressure motor for adjusting the setting of the first pressure regulating valve, means for supplying gas under pressure from said conduit to the pressure motor, a sixth control valve for regulating the supply of gas to the pressure motor, and means, including a calorimeter for measuring the heat content of the mixture of gas and air delivered to the supply main, for operating the sixth control valve to maintain the heat content of the mixture of the gas and air substantially constant.

12. In a gas-air producing plant, the combination of, a source of volatile liquid fuel under pressure, a heat exchanger for vaporizing the volatile liquid fuel into a gas under pressure, means for supplying volatile liquid fuel from said source to the heat exchanger, a conduit for withdrawing gas under pressure from the heat exchanger, inspirator means receiving gas under pressure from said conduit and including a Venturi tube and a suction manifold for entraining air, a supply main for receiving a mixture of gas and air at a reduced pressure from the inspirator means, a first pressure regulating valve for regulating the supply of gas from said conduit to the inspirator means to maintain the pressure of the gas entering the inspirator means at desired values, heating means for supplying a heating fluid to the heat exchanger for vaporizing the volatile liquid fuel, second valve means for controlling the heating effect of the heating means, a pressure motor for operating the second valve means, means including a restriction for supplying gas under pressure from said conduit to the pressure motor, a third control valve for venting gas from the pressure motor to the suction manifold of the inspirator means, means controlled by the temperature of the gas leaving the heat exchanger for operating the third control valve to maintain the temperature of the gas substantially constant, fourth valve means for controlling the supply of gas from said conduit to the inspirator means for rendering the inspirator means operative and inoperative, pressure motor means for operating the fourth valve means, fifth control valve means for admitting gas under pressure from said conduit to the pressure motor means and for exhausting gas therefrom to the suction manifold of the inspirator means, and means responsive to the pressure of the mixture of the gas and air in the supply main for operating the fifth control valve means to maintain the pressure in the supply main substantially constant.

13. In a gas-air producing plant, the combination of, a source of volatile liquid fuel under pressure, a heat exchanger for vaporizing the volatile liquid fuel into a gas under pressure, means for supplying volatile liquid fuel from said source to the heat exchanger, inspirator means receiving gas under pressure from said conduit and including a Venturi tube and a suction manifold for entraining air, a supply main for receiving a mixture of gas and air at a reduced pressure from the inspirator means, a first pressure regulating valve for regulating the supply of gas from said conduit to the inspirator means to maintain the pressure of the gas entering the inspirator means at desired values, heating means for supplying a heating fluid to the heat exchanger for vaporizing the volatile liquid fuel, second valve means for controlling the heating effect of the heating means, a pressure motor for operating the second valve means, means including a restriction for supplying gas under pressure from said conduit to the pressure motor, a third control valve for venting gas from the pressure motor to the suction manifold of the inspirator means, means controlled by the temperature of the gas leaving the heat exchanger for operating the third control valve to maintain the temperature of the gas substantially constant, a pressure motor for adjusting the setting of the first pressure regulating valve, means including a restriction for supplying gas under pressure from said conduit to the pressure motor, a fourth control valve for venting gas from the pressure motor to the suction manifold of the inspirator means, and means, including a calorimeter for measuring the heat content of the mixture of gas and air delivered to the supply main, for operating the fourth control valve to maintain the heat content of the mixture of gas and air substantially constant.

14. In a gas-air producing plant, the combination of, a source of volatile liquid fuel under pressure, a heat exchanger for vaporizing the volatile liquid fuel into a gas under pressure, means for supplying volatile liquid fuel from said source to the heat exchanger, a conduit for withdrawing gas under pressure from the heat exchanger, inspirator means receiving gas under pressure from said conduit and including a Venturi tube and a suction manifold for entraining air, a supply main for receiving a mixture of gas and air at a reduced pressure from the inspirator means, a first pressure regulating valve for regulating the supply of gas from said conduit to the inspirator means to maintain the pressure of the gas entering the inspirator means at desired values, heating means for supplying a heating fluid to the heat exchanger for vaporizing the volatile liquid fuel, second valve means for controlling the heating effect of the heating means, a pressure motor for operating the second valve means, means including a restriction for supplying gas under pressure from said conduit to the pressure motor, a third control valve for venting gas from the pressure motor to the suction manifold of the inspirator means, means controlled by the temperature of the gas leaving the heat exchanger for operating the third control valve to maintain the temperature of the gas substantially constant, fourth valve means for controlling the supply of gas from said conduit to the inspirator means for rendering the inspirator means operative and inoperative, pressure motor means for operating the fourth valve means, fifth control valve means for admitting gas under pressure from said conduit to the pressure motor means and for exhausting gas therefrom to the suction manifold of the inspirator means, means responsive to the pressure of the mixture of the gas and air in the supply main for operating the fifth control valve means to maintain the pressure in the supply main substantially constant, a pressure motor for adjusting the setting of the first pressure regulating valve, means including a restriction for supplying gas under pressure from said conduit to the pressure motor, a sixth control valve for venting gas from the pressure motor to the suction manifold of the inspirator means, and means, including a calorimeter for measuring the heat content of the mixture of gas and air delivered to the supply main, for operating the sixth control valve to maintain the heat content of the mixture of gas and air substantially constant.

15. In a gas-air producing plant, the combination of, a source of gas under pressure, a plurality of inspirators receiving gas under pressure from said source for entraining air, a supply main for receiving a mixture of gas and air at a reduced pressure from the inspirators, first valve means for each inspirator for selectively controlling the supply of gas from the source to its associated inspirator for rendering the inspirators operative and inoperative, a pressure motor for each first valve means for operating the same, second valve means for each pressure motor for admitting gas under pressure from said source to its associated pressure motor and for exhausting gas therefrom, and means responsive to the pressure of the mixture of gas and air in the supply main for sequentially operating the second valve means to maintain the pressure in the supply main substantially constant.

16. In a gas-air producing plant, the combination of, a source of gas under pressure, a plurality of inspirators receiving gas under pressure from said source for entraining air, a supply main for receiving a mixture of gas and air at a reduced pressure from the inspirators, first valve means for each inspirator for selectively controlling the supply of gas from the source to its associated inspirator for rendering the inspirators operative and inoperative, a pressure motor for each first valve means for operating the same, second valve means for each pressure motor for admitting gas under pressure from said source to its associated pressure motor and for exhausting gas therefrom, means responsive to the pressure of the mixture of gas and air in the supply main for sequentially operating the second valve means to maintain the pressure in the supply main substantially constant, a third adjustable pressure regulating valve for controlling the supply of gas from the source to all of the inspirators to maintain the pressure of the gas entering the inspirators at desired values, a pressure motor for adjusting the setting of the third pressure regulating valve, means for supplying gas under pressure from said source to the pressure motor, a fourth control valve for regulating the supply of gas to the pressure motor, and means, including a calorimeter for measuring the heat content of the mixture of the gas and air delivered to the supply main, for operating the fourth control valve to maintain the heat content of the mixture of the gas and air substantially constant.

17. In a gas-air producing system, the combination of, a source of gas under pressure, first valve means for varying the gas pressure in different parts of the system to obtain relatively high and low pressure parts therein, mixing means for combining the gas with air, gas pressure actuated control means for controlling said mixing means, and second valve means for supplying gas to said control means from a relatively high pressure part of the system and for venting said control means to a relatively low pressure part of the system.

18. In a gas-air producing system, the combination of, a source of gas under pressure, first valve means for varying the gas pressure in different parts of the system to obtain relatively high and low pressure parts therein, mixing means for combining the gas with air, gas pressure actuated control means for controlling said mixing means, second valve means for supplying gas to said control means from a relatively high pressure part of the system and for venting said control means to a relatively low pressure part of the system, and means responsive to the pressure in a part of the system for controlling the venting or supplying of gas by said second valve means.

19. In a gas-air producing system, the combination of, a source of gas under pressure, first valve means for varying the gas pressure in different parts of the system to obtain relatively high and low pressure parts therein, mixing means comprising a gas pressure actuated Venturi tube and a suction manifold for entraining air, gas pressure actuated control means for controlling said mixing means, and second valve means for supplying gas to said control means from a relatively high pressure part of the system and for venting said control means to a relatively low pressure part of the system.

JOSEPH E. ROBB.
JOHN M. LARSON.

CERTIFICATE OF CORRECTION.

Patent No. 2,251,636. August 5, 1941.

JOSEPH E. ROBB, ET AL.

It is hereby certified that error appears in the printed specification of the above numbered patent requiring correction as follows: Page 6, first column, line 34, claim 11, for "said valve means, second means for" read --said second valve means, means for--; and that the said Letters Patent should be read with this correction therein that the same may conform to the record of the case in the Patent Office.

Signed and sealed this 4th day of November, A. D. 1941.

(Seal)

Henry Van Arsdale,
Acting Commissioner of Patents.